United States Patent Office 2,951,527
Patented Sept. 6, 1960

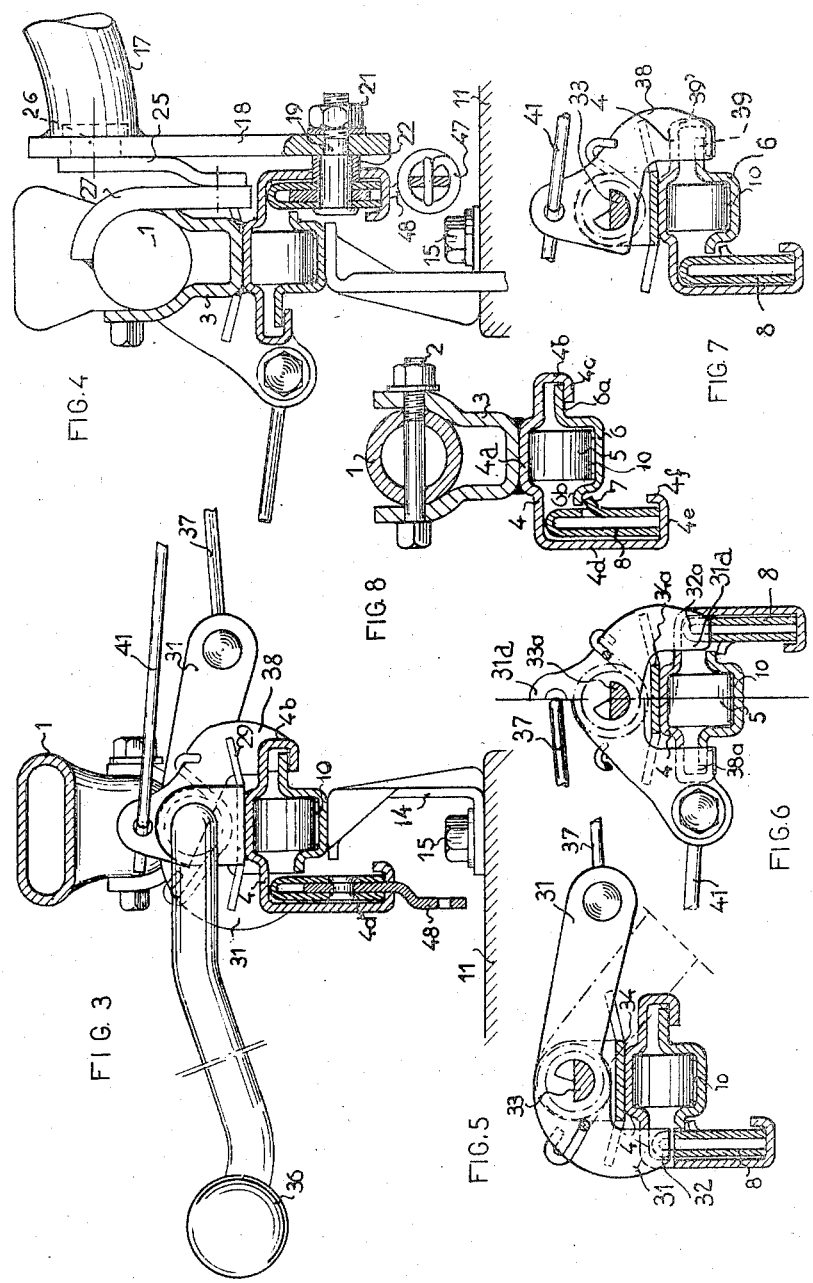

2,951,527
AUTOMOBILE SEAT STRUCTURE
Victor Wassilieff, Rue de l'Assomption, Paris, France
Filed Feb. 7, 1958, Ser. No. 713,837
Claims priority, application France Mar. 1, 1957
10 Claims. (Cl. 155—14)

The present invention relates to a seat structure and, more particularly, to an automobile seat structure of the type in which the seat proper is slidably adjustable along a pair of rails secured to the automobile floor, while the back-rest is hingedly mounted with respect to the seat and may be set in any desired tilted position.

One object of the invention is to provide a seat structure of the aforesaid type in which the movement required for adjusting the seat in fore-and-aft direction and the movement required for adjusting the inclination of the back-rest may be effected conveniently by a person sitting on the seat.

Another object of the invention is to provide a seat structure of the aforesaid type in which the seat and the back-rest may be either safely locked in any desired relative position or disconnected so that it is possible readily to modify either the inclination of the back-rest, or the position of the assembly in fore-and-aft direction.

According to the main feature of the invention, the seat is rigid with a first pair of elongated members adapted to slide on parallel rails or slideways (preferably of the type embodying rollers or the like) secured to the automobile floor, while the back-rest support is pivotally connected to said sliding members and to a second pair of elongated members also adapted to slide along said rails, releasable means being provided for locking the seat with respect to the rails and both pairs of sliding members to the other, whereby upon release of the locking means it is possible either to shift one pair of sliding members relative to the other pair of sliding members and, thus, to adjust the back-rest in any desired tilted position, or to shift both pairs of sliding members together, as a whole, along the rails, thus moving the whole assembly forward or backward.

In one embodiment, the locking means are so designed that it is possible selectively to release one pair of sliding members from the other, or the seat carrying members from the stationary rails, so that it becomes possible either to shift the assembly forward and backward without altering the inclination of the back rest, or to modify the inclination of the back rest without moving the seat.

The locking means may be of any suitable type, for instance of the wedge type or of the latch type.

Further objects and advantages of the invention will be apparent to those skilled in the art, from a consideration of the following description of two specific embodiments of the invention, shown by way of examples, in the accompanying drawings, in which:

Fig. 3 is a fragmentary sectional view made on line 3—3 of Fig. 2,

Fig. 4 is a fragmentary sectional view made on line 4—4 of Fig. 2,

Figure 2:
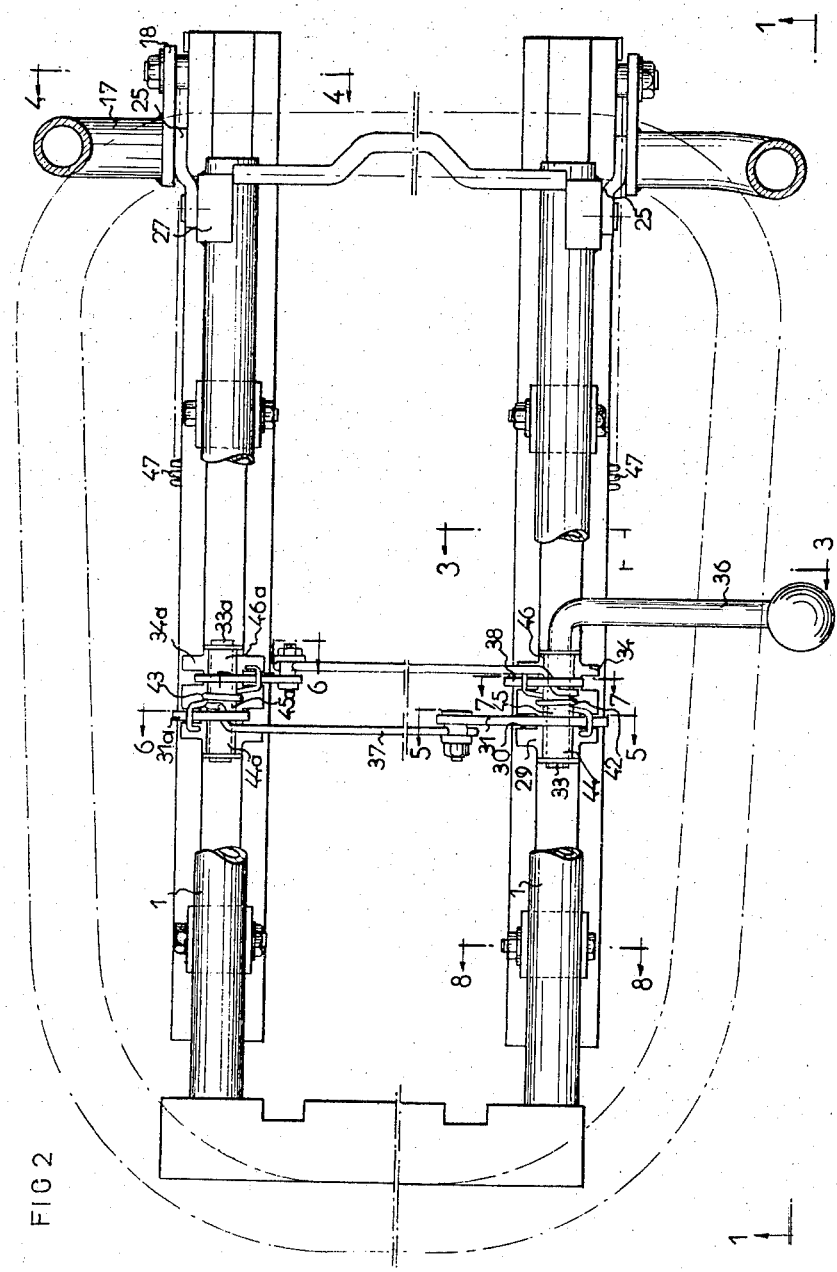
Fig. 2 is a corresponding top view.

Figs. 5 to 8 are fragmentary sectional views made on lines 5—5, 6—6, 7—7 and 8—8 respectively, of Fig. 2, Fig. 9 is a fragmentary top view of a modification, and Fig. 10 is a vertical sectional view made on line 10—10 of Fig. 9.

Figure 1:
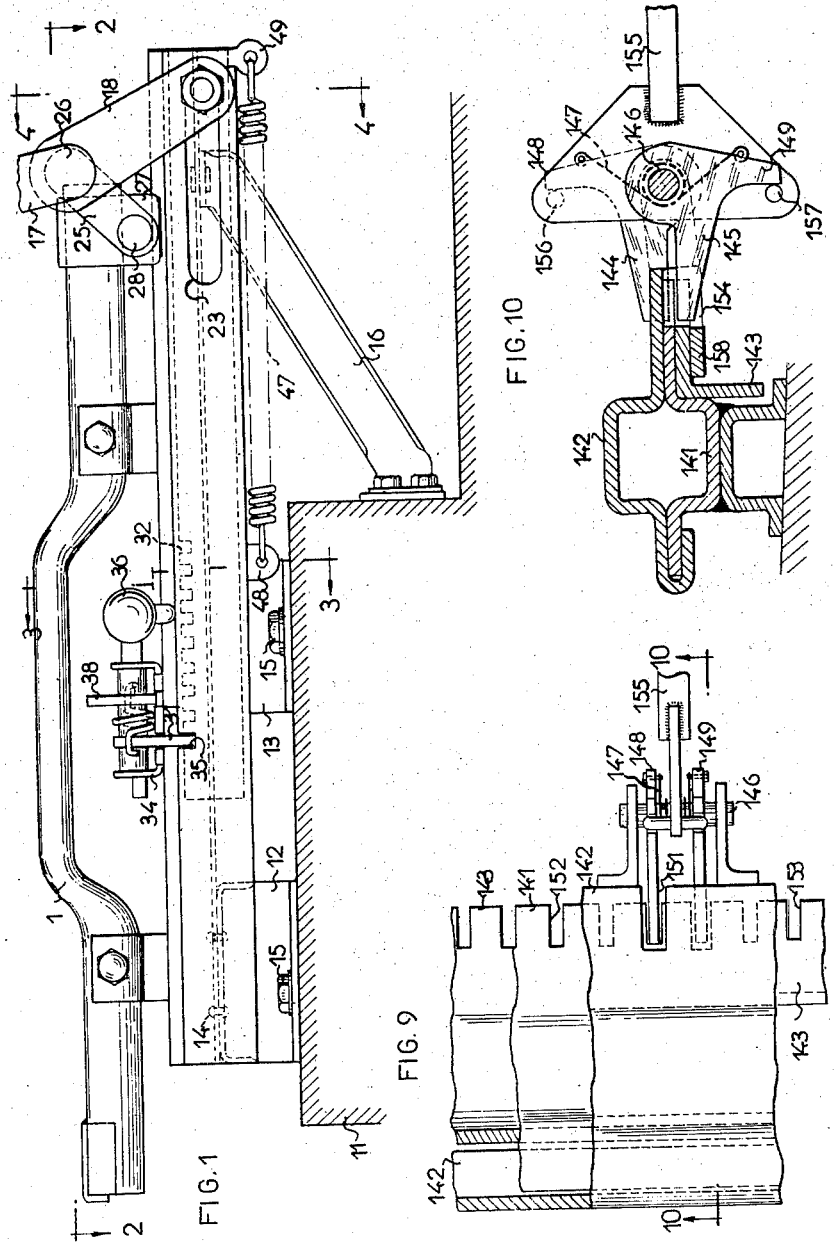
Fig. 1 is an elevational view of an adjustable support for a motorcar seat according to the invention.

Referring to Fig. 1, Fig. 2 and Fig. 8, a seat (not shown) for a motorcar is supported by two parallel tubular members 1 each secured, as by means of bolts 2, to a number (two in the present embodiment) of cradles or yoke pieces 3 which, in their turn, are secured, as by welding for instance, to the top face of a sectional elongated sliding member 4.

Each sliding member 4 is made from a piece of sheet iron suitably folded to the cross-section required, i.e. with a channel 4a serving as a raceway for rollers 5 or similar revolution bodies, the inner edge turned downwardly as at 4b and then horizontally toward the other edge as at 4c, said other or outer edge having a portion 4d folded so as to extend downwardly, a portion 4e folded horizontally and inwardly, and finally, a short portion 4f turned upwardly.

Each member 4 is mounted for sliding movement on a stationary slideway 6 having a substantially U-shaped cross-section. The edge of the slideway 6 is folded down so as to extend in horizontal direction within the channel formed by the top face and the portions 4b and 4c of the corresponding sliding member 4. The rollers 5 are adapted to roll in the channels formed by the U-shaped sections of the stationary slideways 6. The rollways are lined with strips 10 of hardened steel. The portion 4c of each sliding member prevents the latter from being raised away from the stationary slideway 6 by engagement of said portion with the portion 6a of the slideway on the corresponding side thereof. The other edge 6b of each slideway is also folded down to engage lateral lugs 7 of a second sliding member 8 made of sheet metal bent into an inverted U and located in the channel formed by the top face of the first sliding member 4 and the portions 4d, 4e, and 4f thereof.

The slideways 6 which, indeed, serve the purpose of true rollways, rest upon the floor 11 of a motorcar through a number of shoes 12, 13 which are secured both to the slideways and to the floor, as by means of lugs 14 and bolts 15, respectively. In the embodiment described, a portion of each slideway is supported in overhanging relation with respect to the floor by means of a bracing member 16, also riveted to the corresponding slideway and bolted to the floor.

A frame 17 for the back of the seat has two lateral extensions 18 pivoted on the respective second sliding members 8 about a horizontal transverse axis, each by means of a pin 19 secured to the corresponding extension 18 and mounted for pivoting movement in the corresponding second sliding member. In the embodiment described, the pin 19 is a shouldered bolt secured to the extension 18 by a nut 21; a spacing ring 22 is inserted between the lateral face of the sliding member and the extension 18. The pin 19 extends through a longitudinal slot 23 (Fig. 1) cut in the outer lateral wall 4d of the first sliding member 4.

Furthermore, the lower ends of the back frame 17 are connected to the tubular supporting members 1 for the seat by means of two links 25 the ends of which are respectively pivoted to said back frame, as at 26, and to lugs 27 welded to the respective tubular supporting members, as at 28. (Figs. 1, 2 and 4.)

It is clear, so far, that it is possible to make the seat move forwardly and rearwardly by rolling movement of both elongated members on the corresponding stationary rollways 6 and to adjust the angular position of the back by a relative longitudinal movement of the second sliding member 8 relative to the first sliding member 4. The back which is pivoted to the seat, of course, moves along with it.

Description will now be given of means adapted to lock the second sliding members 8 relative to the first sliding members 4 in order to secure the back in any angular position relative to the seat, and also means adapted to lock the first sliding members 4 with respect to the stationary slideways 6 in order to immobilize the whole assembly with respect to the car floor.

One of the second sliding members 8 may be locked in any of a plurality of positions within the corresponding first sliding member by means of a latch 31 adapted to engage any one of a plurality of notches 32 (Figs. 1 and 5) cut in the top portion of the second sliding member 8. The latch 31 is mounted on a spindle 33 for a lost pivotal motion thereon. For this purpose, the cross-section of the portion of the spindle 33 on which the latch is mounted is a semi-circle, while the aperture of the latch through which said spindle portion extends is in the shape of a circular sector greater than a semi-circle, in such a manner that a rotational movement of the spindle 33 in clockwise direction from the position shown in Fig. 5, causes the latch 31 to be pivoted in the same direction while a rotational movement of the spindle in counterclockwise direction has no effect upon the latch.

The cylindrical end portions of the spindle 33 are mounted for pivotal movement in a U-shaped support 34 secured to the top face of the first sliding member 4 which is formed with lateral wings 29 having latch guiding slots 30. The spindle 33 extends in a direction parallel with that of the slideways and the nose of the latch 31 is located in a transverse slot 35 (Fig. 1) of the first sliding member 4. The spindle 33 is formed with a bent extension adapted to serve as a common handle for operating the latch 31 and all the further latches as hereinunder explained. When the latch 31 assumes the position represented in full lines in the drawings, and more particularly in Fig. 5, the sliding member 8 is locked within the sliding member 4, whereas, when it assumes the position indicated in interrupted lines in Fig. 5, i.e. when it is disengaged from the notches 32, the member 8 is allowed to be slid freely along the member 4, and the back therefore, may be given any desired inclination.

Similarly, the other slidable member 8 may be locked within the slidable member 4 by means of a latch 31a mounted on a spindle 33a also with a lost angular motion similar to the lost angular motion of the latch 31, however symmetrically designed with respect to the vertical middle plane of the seat. The spindle 33a is mounted for pivotal movement in a support 34a secured to the corresponding sliding member 4. The nose of the latch 31a is adapted to engage any one of a plurality of notches 32a cut in the top portion of the corresponding sliding member 8. The latch 31a may be actuated from the common operating handle 36 by virtue of a connecting rod 37 the ends of which are pivoted to the latches 31 and 31a respectively, in such a manner that raising the handle 36 causes both latches to be disengaged from the corresponding notches.

In a similar manner, one of the first sliding members 4 may be locked in any of a plurality of positions on the corresponding stationary slideway 6 by means of a latch 38 adapted to engage any one of a plurality of notches 39 (Fig. 7) cut in the inner edge of the stationary slideway 6. The latch 38 is also mounted on the spindle 33 with a similar angular lost motion, however oppositely set with respect to the lost motion of the latch 31, so that an angular movement of the spindle in clockwise rotational direction causes the latch 31 alone to rock, while a pivotal movement of the spindle in counter clockwise direction (Fig. 7) causes the latch 38 to rock alone. The nose of the latch 38 is located in a transverse slot 39 of the sliding member 4. Similarly, the other slidable member 4 may be locked with respect to the corresponding stationary slideway 6 by means of a further latch 38a similarly mounted on the spindle 33a, i.e. through a lost motion symmetrical to the lost motion of the latch 38 with respect to the vertical plane of symmetry of the seat. The latch 38a is adapted to engage corresponding notches of the other stationary slideway 6, and may be actuated from the common operating handle 36 by virtue of a connecting rod 41 the ends of which are pivoted to the latches 38 and 38a respectively, in such a manner that lowering the handle 36 causes both latches to be disengaged from the corresponding notches.

All four latches are urged to engaged position, and, therefore, the common operating handle 36 is urged to neutral middle position (as shown in full lines in Fig. 3 and others), by two coil springs 42, 43 wound around the spindles 33 and 33a respectively. The end portions of the spring 42 are bearing against the top edges of the latches 31 and 38 respectively, while the end portions of the spring 43 bear against the top edges of the latches 31a and 38a respectively.

Spacing sleeves 44, 45, 46 are threaded over the spindle 33 between the latches 31 and 38 and the flanges of the support 34 for a better positioning of the latches on the spindle. Similar sleeves 44a, 45a, 46a are arranged on the spindle 33a.

Each of the second or inner sliding members 8 is urged rearwardly with respect to the corresponding first sliding member 4, by a helical spring 47 (Figs. 1 and 4) one end of which is attached to a lug 48 (see also Fig. 3) riveted to the sliding member 8 and the other end attached to a lug 49 secured to the outer lateral face of the sliding member 4. The aim of these springs is to urge the back of the seat upwardly.

When it is desired to move the seat together with the back in forward or backward direction, the operating handle is depressed downwardly; this movement causes the latches 38 and 38a to rock so as to disengage from the notches of the stationary slideways 6. Therefore, it is now possible to move the whole assembly in the desired direction to the position required. Upon this position being reached, the handle is released and therefore restored to neutral middle position by the action of the springs 42, 43, and the latches again engage the aforesaid notches, thus locking the seat in place. It is to be noted that, during the adjusting movement of the seat, the latches 33 and 33a were left untouched, i.e. in engaged position by virtue of the aforesaid lost motions, and the back, therefore, was maintained in its original inclination.

Now, if it is desired to modify the inclination of the back of the seat, the handle 36 is raised; this movement causes the latches 33 and 33a to rock so as to disengage from the notches in the inner sliding members 8. Therefore, it is now possible to rock the back either rearwardly against the action of the springs 47 or to let it pivot upwardly under the action of said springs to the desired inclination. Upon the required position of the back being reached, the handle is released and, therefore restored to neutral middle position by the action of the springs 42, 43 and the latches again engage the aforesaid notches, thus locking the back to the desired inclination. Similarly, during adjusting movement of the angular position of the back, the latches 38, 38a were left untouched, i.e. in engaged position, and the seat, therefore, was held in its original longitudinal position.

The lost motion connection between the spindle 33a and the latches 31a and 38a mounted thereon is not necessary since said latches are actuated by the connecting rods 37 and 41 respectively. The cross-section of the spindle 33a, therefore, may be circular and the bores of the latches 31a and 38a may be plain round holes.

In a simplified embodiment, one of the sliding members of the aforesaid second pair of sliding members may be omitted, provided the back-rest support be pivoted to the first pair of sliding members and operatively connected to the third sliding member. The back rest support, then, will be locked on one side only, while the seat may be locked on both slideways, or on one slideway only, if it is desired to simplify the structure still to a greater extent.

In another simplified embodiment illustrated in Figs. 9 and 10, one stationary slideway is indicated as at 141, the corresponding first sliding member being 142 and the second sliding member being 143. Two levers 144 and 145 are pivotally mounted on a common stud 146 carried by the sliding member 142. Both levers are urged toward each other by a coil spring 147 wound about the stud 146 and the end portions of which are in bearing engagement respectively with two arms 148 and 149 rigid with the corresponding levers 144 and 145. The lever 144 is adapted to lock the sliding member 142 relative to the stationary slideway 141. To this end, both the sliding member 142 and the slideway 141 have notches 151 and 152, respectively, into which the lever 144 may be engaged.

In a similar manner, the sliding member 143 has notches 153 and the lever 145 may be engaged simultaneously into a notch 153 of the sliding member 143 of the back-rest and into a notch 154 cut in a portion 158 of the sliding member 142 folded about the edges of the stationary slideway 141 and of the back-rest sliding member 143.

The lever 144, therefore, serves for clamping the seat, whereas the lever 145 serves for locking the back-rest in any desired tilted position.

In order selectively to release the seat or the back-rest, a lever 155 pivotally mounted on the stud 146 carries two pins 156 and 157 capable of engaging the arms 148 and 149 against the edges thereof opposite the edges engaged by the restoring spring 147. Upon the lever 155 being pivoted clockwise (Fig. 10) the lever 144 is raised and the seat released. The latter, therefore, may be slid at will, and the back-rest, however, is held fixed with respect to the seat, by virtue of the locking action exerted by the other lever 145. Conversely, upon the lever 155 being pivoted counterclockwise, the lever 145 is lowered and the back rest sliding member 143 is released from the seat. The angular position of the back rest, therefore, may be varied at will, but the seat is held stationary by the action of the other locking lever 144.

As many changes could be made in the above constructions, and many widely different embodiments of this invention could be made without departing from the scope of the claims, it is intended that all matter contained in the above description or shown in the accompanying drawings shall be interpreted as illustrative and not in a limiting sense.

What is claimed is:

1. An adjustable seat structure comprising, in combination, a stationary slideway, an elongated channel-like first sliding member supporting said seat and slidably mounted on said slideway so as to be guided thereby for longitudinal reciprocation, a second elongated sliding member mounted in said first sliding member so as to be guided thereby for longitudinal reciprocation, an adjustable back-rest having a pivotal connection with said seat and a pivotal connection with said second sliding member whereby adjustment of the angular position of said back-rest with respect to said seat will move said second sliding member relative to said first sliding member, first releasable locking means to hold said first sliding member against movement with respect to said slideway, second releasable locking means to lock said first and said second sliding members against relative movement, and a manually operable actuating member having a lost motion connection with each of said first and second locking means for selectively moving one or the other of said first and second locking means to released position.

2. A seat structure according to claim 1, further comprising spring means adapted to urge said second sliding member relative to said first sliding member in the longitudinal direction corresponding to raising movement of said back rest support.

3. A seat structure according to claim 1, wherein said first locking means comprises a latch member mounted on a spindle journalled in a support secured to said first sliding member, said latch being adapted to engage any one of a plurality of longitudinally spaced notches cut in said slideway upon pivotal movement of said latch member about said spindle axis in one rotational direction, and wherein said second locking means comprises a second latch member also mounted on said spindle and adapted to engage any one of a plurality of longitudinally spaced notches cut in said second sliding member upon pivotal movement of said second latch member about said spindle axis in a rotational direction opposite said one rotational direction, said lost motion connection being provided between said spindle and each of said two latches, and said manually operable actuating member being connected to said spindle whereby movement of said manually operable member in one direction from a middle neutral position ensures release of said first latch member while movement of said manually operable member in the other direction from said middle neutral position ensures release of said second latch.

4. A seat structure according to claim 3, wherein said latches are urged to engaged position by a spring one end of which is attached to one of said latches and the other end thereof to the other of said latches, whereby said spring furthermore tends to restore said manually operable member to said middle position.

5. A seat structure according to claim 3, wherein said lost motion pivotal connection between said spindle and each of said two latches is constituted by the cross-section of the portion of the spindle on which the latches are mounted being in the shape of a sector of circle bounded by two radii forming a given angle while the cross-section of the bore of each latch is in the shape of a sector of circle bounded by two radii forming an angle greater than said given angle.

6. A seat structure according to claim 3, wherein each latch member is movable in a guiding slot cut in a lateral wing of said support.

7. A seat structure according to claim 1, wherein the cross-section of said slideway is generally U-shaped with the edges folded out in horizontal direction, while the cross-section of the said first sliding member is in the shape of an inverted U arranged over said slideway with its edges folded inwardly under the folded edges of said slideway for preventing said sliding member from being raised away from said slideway.

8. A seat structure according to claim 7, wherein revolution bodies are in rolling engagement between the bottoms of the U-shaped cross-sections of said slideway and of said first sliding member.

9. A seat structure according to claim 7, wherein said second sliding member has a flat vertical cross-section arranged within the cross-section of said first sliding member, along a lateral face thereof and having at least a portion interposed between the top inner face of a folded edge of said first sliding member and the under outer face of the corresponding folded edge of said slideway.

10. A seat structure according to claim 7, wherein said second sliding member has a flat U-shaped cross-section oriented vertically.

References Cited in the file of this patent

UNITED STATES PATENTS

| | | |
|---|---|---|
| 2,636,545 | Johnson | Apr. 28, 1953 |
| 2,798,532 | Clark | July 9, 1957 |
| 2,827,106 | Cramer | Mar. 18, 1958 |

FOREIGN PATENTS

| | | |
|---|---|---|
| 508,019 | Great Britain | June 22, 1939 |